US009665256B2

(12) United States Patent
Reavis

(10) Patent No.: US 9,665,256 B2
(45) Date of Patent: *May 30, 2017

(54) IDENTIFYING SELECTED DYNAMIC CONTENT REGIONS

(71) Applicant: Adobe Systems Incorporated, San Jose, CA (US)

(72) Inventor: Daren G. Reavis, Spanish Fork, UT (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,532

(22) Filed: Dec. 11, 2015

(65) Prior Publication Data

US 2016/0098178 A1   Apr. 7, 2016

Related U.S. Application Data

(63) Continuation of application No. 13/220,926, filed on Aug. 30, 2011, now Pat. No. 9,245,274.

(51) Int. Cl.
| | |
|---|---|
| G06F 15/177 | (2006.01) |
| G06F 3/0484 | (2013.01) |
| G06Q 30/02 | (2012.01) |
| H04L 29/08 | (2006.01) |
| H04L 29/06 | (2006.01) |
| H04L 12/26 | (2006.01) |

(52) U.S. Cl.
CPC ...... G06F 3/04842 (2013.01); G06F 3/04847 (2013.01); G06Q 30/02 (2013.01); H04L 29/06 (2013.01); H04L 29/08 (2013.01); H04L 43/00 (2013.01)

(58) Field of Classification Search
None
See application file for complete search history.

(56) References Cited

U.S. PATENT DOCUMENTS

| | | | |
|---|---|---|---|
| 7,680,646 | B2 | 3/2010 | Lux-Pogodalla et al. |
| 8,131,703 | B2 | 3/2012 | Bessieres et al. |
| 9,081,865 | B2 | 7/2015 | Reavis |
| 2005/0021549 | A1 | 1/2005 | O'Neil et al. |
| 2005/0166138 | A1* | 7/2005 | Kundu ............... G06F 17/3089 715/206 |

(Continued)

OTHER PUBLICATIONS

U.S. Appl. No. 13/220,919, "Non-Final Office Action", Aug. 27, 2014, 30 pages.

(Continued)

*Primary Examiner* — Joshua Joo
*Assistant Examiner* — Younes Naji
(74) *Attorney, Agent, or Firm* — Kilpatrick Townsend & Stockton LLP

(57) ABSTRACT

Selected regions in dynamic content may be identified. Analytics data may be received that may include a region identifier corresponding to a region from which a selectable element was selected from the content. It may be determined that the analytics data corresponds to a current region of a current version of the network content. Analytics data, which may include a region identifier, may be generated in response to a selection of a selectable element of content located within a region of network content.

20 Claims, 9 Drawing Sheets

(56) References Cited

U.S. PATENT DOCUMENTS

| | | | |
|---|---|---|---|
| 2006/0123340 A1* | 6/2006 | Bailey | G06F 9/44526 715/700 |
| 2008/0298458 A1 | 12/2008 | Yang et al. | |
| 2008/0307301 A1 | 12/2008 | Decker et al. | |
| 2010/0235793 A1* | 9/2010 | Ording | G06F 1/1626 715/863 |
| 2012/0331128 A1 | 12/2012 | Seifert et al. | |
| 2014/0304301 A1 | 10/2014 | Reavis | |
| 2014/0304389 A1 | 10/2014 | Reavis | |

OTHER PUBLICATIONS

U.S. Appl. No. 13/220,919, "Notice of Allowance", Mar. 27, 2015, 23 pages.

U.S. Appl. No. 13/220,926, "Advisory Action", May 27, 2015, 6 pages.

U.S. Appl. No. 13/220,926, "Final Office Action", Jan. 29, 2015, 27 pages.

U.S. Appl. No. 13/220,926, "Non-Final Office Action", Jul. 17, 2014, 17 pages.

U.S. Appl. No. 13/220,926, "Notice of Allowance", Oct. 7, 2015, 19 pages.

DZone Snippets, "Get XPath," copyright 2007 DZone, Inc., downloaded from http://snippets.dzone.com/posts/show/4349, 2 pages.

Wikipedia, XPath, downloaded from http://en.wikipedia.org/wiki/Xpath on Aug. 9, 2011, 2 pages.

Wikipedia, "Cascading Style Sheets," downloaded from http://en.wikipedia.org/wiki/CSS_selector#Syntax on Aug. 9, 2011, 14 pages.

U.S. Appl. No. 13/220,919, filed Aug. 30, 2011, Adobe Systems Incorporated, all pages.

* cited by examiner

IDENTIFYING SELECTED DYNAMIC CONTENT REGIONS

CROSS REFERENCE TO RELATED APPLICATION

This application is a continuation application of U.S. patent application Ser. No. 13/220,926 filed Aug. 30, 2011, the entire contents of which are incorporated herein by reference for all purposes.

BACKGROUND

Network content (e.g., website) providers often wish to collect data that describes usage and visitation patterns for their websites and for individual webpages within the sites. This data is often referred to as web analytics data. Such information can be extremely valuable in developing usage statistics for various purposes, including, for example, estimating server load, determining advertising rates, identifying areas of websites that are in need of redesign, and the like.

Web analytics data is often collected via logfile analysis or page tagging. Logfile analysis includes reading logfiles that store a web server's transactions. Page tagging uses executable code on each webpage, such as Java Script, to notify a third party when a webpage is rendered by a browser. For example, the webpage may include a request to a web analytics provider that is embedded within the Hypertext Markup Language (HTML) code. When the webpage is rendered by a browser at a user's computer, the request is transmitted to the web analytics, thereby notifying the web analytics provider of the rendering of the webpage. In some instances, the request includes a request for an image, and the web analytics provider simply returns a single transparent pixel for display by the browser, thereby fulfilling the request.

The request itself often includes web analytics data, such as data about the user, the user's computer, the content of the webpage, or any other web analytics data that is accessible and of interest. The web analytics provider may parse the request to extract web analytics data contained within the request. The collected web analytics data may be processed and provided to a website administrator for use in assessing and optimizing their website.

The webpage including the embedded request is typically provided via a content server operated, or at least under the direction of a content provider, such as an on-line vendor, media portal, or news website. In some instances, a webpage may include dynamic content that changes often (e.g., daily, hourly, upon a news event, etc.). And in some of those cases, a region of the webpage containing the dynamic content can be relatively static. For example, a webpage may have a top story region that includes the top stories at a given time. Thus, at one time, the top story may be directed to one selectable element (e.g., link, button, etc.) while at another time, the top story may be directed to another selectable element. In some cases, individual selectable elements or links on a webpage may move or relocate to a different part of a webpage over time. For example, a link that was in the top news story location at 1:00 pm may move to a side news story location at 3:00 pm and completely off the webpage the following day. Similarly, duplicate links may exist on a webpage, such as a webpage that duplicates the top news story link in another portion of the page, such as a side portion.

Traditional web analytics techniques suffer in performance for such dynamic content in terms of reliability, storage requirements, and compatibility. As a result, information collected for dynamic content by typical web analytics techniques is less useful.

SUMMARY

This disclosure describes techniques and structures for identifying dynamic content regions. In one embodiment, analytics data may be received that may include a region identifier corresponding to a region of content from which a selectable element was selected. It may be determined that the analytics data corresponds to a current region of a current version of the network content. In some embodiments, second analytics data may be received that may include the same region identifier and it may be determined that the second analytics data also corresponds to the current region of the current version of the network content. In some instances, the second analytics data may have been generated from a selection of a different selectable element located within the same region of the network content. In various embodiments, an indication of an aggregate value of selections of selectable elements from the region of the network content may be overlaid on top of a display of the current version of the network content.

In various embodiments, first analytics data, which may include a region identifier, may be generated in response to a selection of a selectable element located within a region of content. Second analytics data, which may include the same region identifier, may be generated in response to a selection of a different selectable element located within a region of content.

Figure 1:
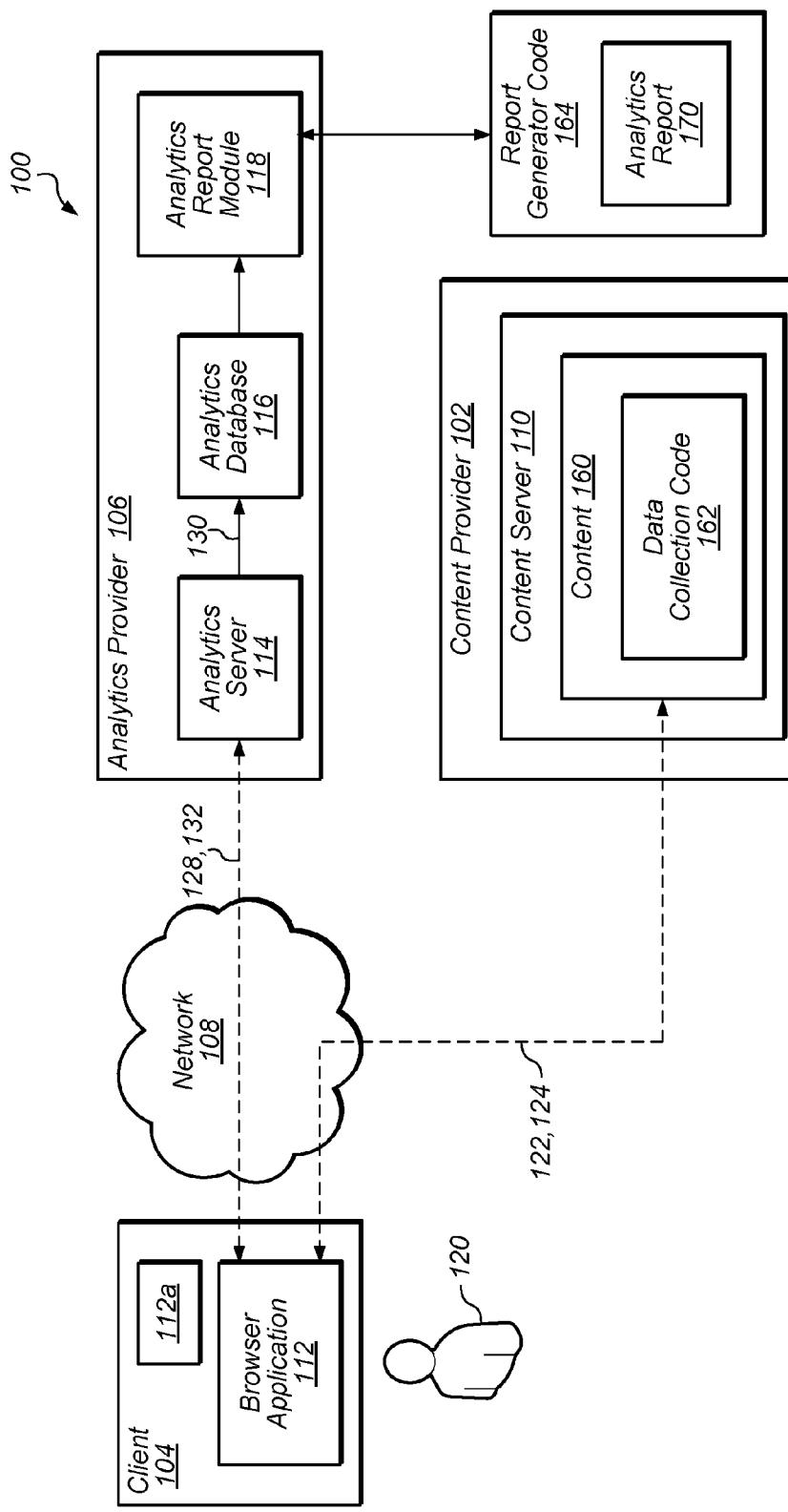
FIG. 1 is a block diagram that illustrates an example analytics system, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF THE PREFERRED EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

First," "Second," etc. As used herein, these terms are used as labels for nouns that they precede, and do not imply any type of ordering (e.g., spatial, temporal, logical, etc.). For example, in network content having eight selectable elements, the terms "first" and "second" selectable elements can be used to refer to any two of the eight selectable elements. In other words, the "first" and "second" selectable elements are not limited to logical links 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for analytics data collection and analytics data matching are described. Some embodiments may include a means for collecting analytics data or a means for matching analytics data. For example, a data collection module may generate analytics data that includes a hierarchical position identifier and/or region identifier. Or, an analytics data matching module may match analytics data to elements and/or regions of a current version of content by utilizing a hierarchical position identifier or region identifier of the analytics data. The data collection module and analytics data matching module may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform collecting and/or matching analytics data, as described herein. Other embodiments may be at least partially implemented by hardware circuitry and/or firmware stored, for example, in a non-volatile memory.

Although certain embodiments are described with respect to a webpage and/or website, it will be appreciated that the techniques disclosed herein may be employed with other forms of network content sites, such as documents with a traversable tree-like hierarchy (e.g., XML, HTML, etc.).

Turning now to the figures, FIG. 1 is a block diagram that illustrates an analytics system 100 (e.g., web analytics, network analytics), according to some embodiments of the present disclosure. In the illustrated embodiment, system 100 includes content provider 102, client 104 and analytics provider 106. Each of content provider 102, client 104 and analytics provider 106 may be communicatively coupled to one another via a network 108. Network 108 may include any channel for providing effective communication between each of the entities of system 100. In some embodiments, network 108 includes an electronic communication network, such as the internet, a local area network (LAN), wireless LAN (WLAN), WiMAX network, cellular communications network, or the like. For example, network 108 may include an internet network used to facilitate communication between each of the entities (e.g., content provider 102, client 104 and analytics provider 106) of system 100.

Content provider 102 may include source of information/content (e.g., a file defining display information for one or more content items, such as a website) that is provided to client 104. For example, content provider 102 may include media portals or dynamic websites used to present media and/or dynamic content (e.g., news). As another example, content provider 102 may include vendor websites used to present retail merchandise to a consumer. For instance, the vendor website may include a dynamic portion for featured merchandise that may change frequently (e.g., daily specials). In some embodiments, content provider 102 may include content server (e.g., network content server, web content server) 110. Content server 110 may include content 160, such as network and/or website content (e.g., web pages), stored thereon that are accessed and loaded by client 104 when viewing respective webpages of content provider 102. Content 160 may include analytics data collection code 162, as described in detail below, among other components.

Client 104 may include a computer, mobile device (e.g., cellular phone, tablet device, etc.), or similar device used to access content provided by content provider 102. In some embodiments, client 104 may include a computer employing a browser application 112 that is used to interact with webpages and websites provided by content provider 102. For example, browser application 112 may render a webpage of content provider 102. Rendering may include executing HTML code for the webpage provided by content provider 102. As a result, browser may also generate appropriate request for data from various servers of system 100 to assemble the webpage for display on client 104. Webpage 104 may be viewed by a user via a monitor or similar presentation device at client 104.

Analytics provider 106 may include a system for the collection and processing of analytics data (e.g., network analytics, web analytics, etc.). Analytics provider 106 may include a third-party website traffic statistic service that is a physically separate entity from content provider 102. Analytics provider 106 may reside on a different network location from content providers 102 and client 104. Analytics data may include data that describes usage and visitation patterns for websites and for individual webpages within the website. Analytics data may include a user identifier, for example, as well information describing the webpages visited, which selectable elements have been selected, and the dates and times of the visits. According to some embodiments, web analytics data may also include data regarding regions of a webpage from which selectable elements have been selected. Further, in some embodiments, web analytics data may include a hierarchical position identifier, as described herein.

In the illustrated embodiment, analytics provider 106 includes analytics server 114, analytics database 116, and analytics report module 118. Analytics server 110 may service requests from one or more clients. For example, upon loading/rendering of a webpage 112a by browser 112 of client 104, browser 112 may generate a request to analytics server 114 via network 108. Analytics server 114 may process the request by returning appropriate content (e.g., an image) to browser 112 of client 104. In some embodiments, the request includes a request for an image, and analytics provider 106 simply returns a single transparent pixel for display by browser 112 of client 104, thereby fulfilling the request. The request itself may also include embedded analytics data. Some embodiments may include embedding a pointer to a resource, known as a "web bug" in HTML code. The resource may be invisible to the user, such as a transparent one-pixel image. The pointer may direct browser 112 of client 104 to request the resource from analytics server 114. Analytics server 114 may record the request, and record additional information associated with the request, such as the date and time, and/or identifying information that may be encoded in the resource request. In some embodiments, an image request embedded in the HTML code of the webpage may include codes/strings that are indicative of analytics data, such as data about the user, the user's computer, the content of the webpage, or any other analytics data that is accessible and of interest. A request for an image may include, for example, "image.gif/XXX. . . " wherein the string "XXX. . . " is indicative of the analytics data. Analytics provider 106 may parse the request (e.g., at server 114 or report module 118) to extract the analytics data contained within the request. The analytics data may be stored in analytics database 116, or a similar storage/memory device. In some embodiments, analytics data may be stored in a remote location from analytics provider 106. In some embodiments, analytics report module 118 may receive or retrieve analytics data from analytics server 114 and/or database 116. Analytics report module 118 may process the analytics data to generate one or more analytics reports. For example, analytics report module 118 may filter the raw analytics data received at analytics server 114 to generate concise and complete analytics reports 170, as may be requested by a website administrator of content provider 102 or other party. Analytics report 170, for example, may include overviews and statistical analyses describing the relative frequency with which various site paths are being followed through the content provider's website. In some embodiments, analytics report 170 may include a visual indication overlaid on top of a current version of the content provider's website. For example, the visual indication may indicate a frequency of selection or activation of a selectable element or region of a webpage. The frequency may represent the frequency of selection of the same selectable element from a dynamic webpage, for example. For instance, if a selectable element A is located in the middle of the webpage at one time and is selected three different times at that location and then selectable element A is moved to a right-hand portion of the webpage and selected five times from that location, analytics report 170 may include an overlay on top of the current version of the website, or some other representation of the content, indicating that selectable element A has been clicked a total of eight times.

In some embodiments, analytics report module 118 and analytics report 170 may not reside in analytics provider 106 and content provider 102, respectively, as shown in FIG. 1. For example, analytics report module 118 and analytics report 170 may be co-located at content provider 102 or at some third party location. Or, as described in more detail at FIG. 2B, report generator code 164 may process the analytics data from analytics provider 106. Report generation may occur in a stand-alone application or may occur as part of a browser plug-in.

In some embodiments, a user 120 interacts with a device at client 104, to execute a software application, such as browser application 112 of client 104, for accessing and displaying one or more webpages 112a. In response to a user command, such as clicking on a link or typing in a uniform resource locator (URL), browser application 112 may issue a webpage request 122 to web content server 110 of content provider 102 via network 108 (e.g., via the Internet). In response to request 122, content server 110 may transmit the corresponding webpage code 124 (e.g., HTML code corresponding to webpage 112a) to browser application 112. Browser application 112 may interpret the received webpage code to display the requested webpage to user 120 at client 106. Browser application 112 may generate additional requests for content (not shown in FIG. 1) from the server, as needed.

In some embodiments, client 104 also transmits webpage visitation tracking information to analytics provider 106. For example, webpage code 124 may include executable code to initiate a request for data from web analytics server such that execution of webpage code 124 and/or selection of selectable elements of browser 112 causes browser 112 to generate a corresponding request 128 for the data to analytics server 114. In some embodiments, request 128 may itself have analytics data contained therein or associated therewith, such that transmitting request 128 causes transmission of analytics data from client 104 to analytics provider 106. For example, as described above, request 128 may include an image request having an embedded string of data therein. Analytics provider 106 may process (e.g., parse) request 128 to extract analytics data 130 contained in or associated with request 128. Where request 128 includes a request for an image, analytics server 114 may simply return an image 132 (e.g., a single transparent pixel) to browser 112, thereby fulfilling request 128. In some embodiments, analytics server 106 may transmit analytics data 130 and/or a corresponding report 170 to content provider 102, or other interested parties. For example, analytics data 130 (e.g., raw data) and/or analytics reports 170 may be forwarded to site administrators or owners of content provider 102.

Figure 2A:
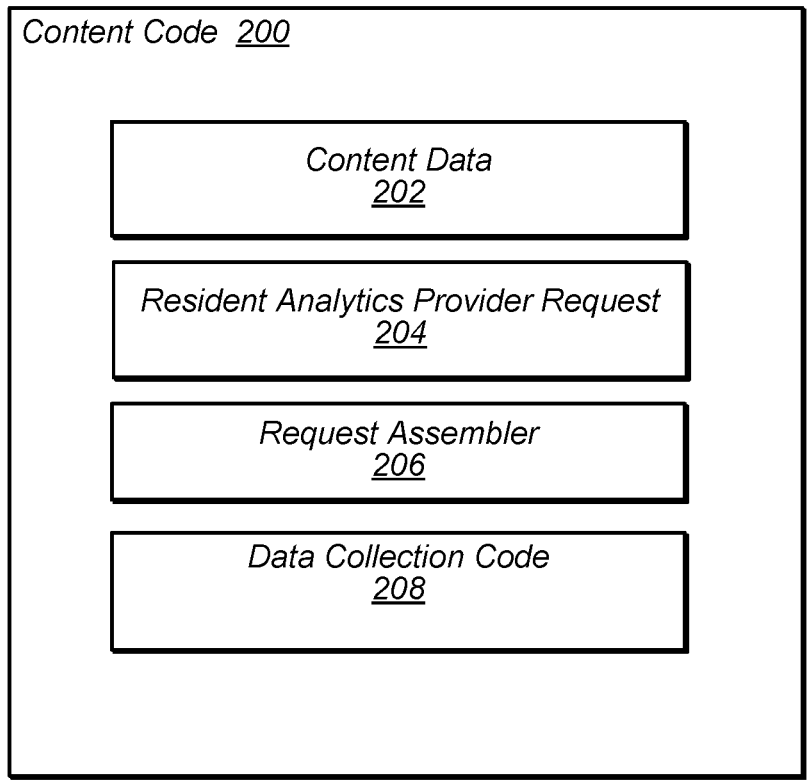
FIG. 2A is a diagram that illustrates an example of content code, according to some embodiments.

FIG. 2A is a diagram that illustrates content code 200, according to some embodiments. Content code 200 may include executable code that is provided in response to a request for a webpage or similar network site content. For example, content code 200 may be provided to browser application 112 of client 104 from content server 110 of content provider 102 in response to a request from browser application 112 for the corresponding webpage. In some embodiments, content code may include HTML code that is executed to render webpage 112a at a presentation device of client 104 for viewing by a user.

In the illustrated embodiment, webpage code 200 includes webpage data 202, a resident web analytics provider request ("resident request") 204, request assembler 206, and data collection code 208. In some embodiments, webpage data 202 may include traditional code for providing content of a webpage for viewing by a user. For example, webpage data 202 may include a definition of text to be displayed and/or images to be retrieved for display on the webpage. Further, webpage data 202 may include selectable elements (e.g., links, buttons, clickable elements (having an on click attribute), elements with anchor tags, etc.).

Resident request 204 may include a portion of webpage code 200 that, upon execution, initiates sending a request to a web analytics provider that includes web analytics data. In some embodiments, resident web analytics provider request 204 may generate a request similar that of request 128 described above with respect to FIG. 1. For example resident web analytics provider request 204 may generate an image request having web analytics data embedded therein. In some embodiments, additional requests to the analytics provider may be generated and sent in response to selection of a selectable element of content 160. For example, a user clicking on a link of a webpage may cause a request to be generated and sent to analytics provider 106.

Request assembler 206 may include a portion of webpage code 200 that, upon execution, assembles web analytics data in accordance with one or more requests to the web analytics provider. In some embodiments, request assembler 206 includes logic that compiles the web analytics data into a string that is embedded within a request similar that of request 128 described above with respect to FIG. 1. For example, request assembler 206 may generate an image request to be provided to a web analytics server, the image request including, for example, "image.gif/XXX. . . " wherein "image.gif" is indicative of an image and the string "XXX. . . " is indicative of the web analytics data. In some embodiments, request assembler may also include logic capable of assembling multiple requests into a single request that is to be transmitted to the web analytics provider.

Data collection code 208 may allow for the generation of analytics data. In some embodiments, analytics data may be generated in response to selection of a selectable element of content 160. The analytics data may include multiple identifiers that identify the selectable element. In some embodiments, one of the identifiers may be a primary-tag type (e.g., link anchor tag, image, button, action, etc.). Other identifiers may be a hierarchical position identifier and, in some cases, a native browser identifier (e.g., sourceindex property). In some embodiments, identifiers such as the primary-tag type or an ID attribute (e.g., element ID attribute, region ID attribute, etc.) may be predefined. A region ID attribute may be defined with a container. An example of a region ID attribute may be <div onclick="s_regionID='myregion';">. In such cases, the generation of the identifiers may be derived from the content.

In one embodiment, data collection code 208 may generate analytics data including a hierarchical position identifier in response to a selection of a selectable element from the content. The content may be dynamic in that one or more selectable elements may be moved within a hierarchical data structure (e.g., html file) of the content. In some embodiments, data collection code 208 may generate second analytics data including a second hierarchical position identifier in response to a second selection of the same selectable element. In some cases, the first and second hierarchical position identifiers may be the same. In other instances, the least significant portion of the first and second hierarchical position identifiers may be different while the remaining portion may be the same. As described in detail below regarding the matching code, the hierarchical position identifiers may allow selectable elements within dynamic content to be matched so as to accurately track selection of selectable elements, with reduced cardinality and storage requirements, and greater reliability.

The hierarchical position identifiers may include tag names for a number of parent nodes located above the selectable element in a hierarchical data structure of the content at the time of generation of the identifier. In some instances, the number of parent nodes for which tag names may be included in the hierarchical position identifiers may be limited to a number of parent nodes (e.g., 4, 6, 8, etc.). In determining the number of parent nodes, and corresponding length of the hierarchical position identifier, a trade-off may exist between accuracy/reliability versus storage requirements such that a larger number of parent nodes may increase accuracy but may require greater storage. Likewise, a fewer number of parent nodes may decrease accuracy but may require less storage.

The respective hierarchical position identifiers may include information on the corresponding selectable element's respective order among peer nodes in a hierarchical data structure below a closest common parent node. For instance, a selectable element may be the fifth selectable element under its closest parent node. Therefore, the hierarchical position identifier may include data indicating that the corresponding selectable element is fifth. As an example, assume the hierarchical identifier is "html, body, div#mydiv [3], p[4], a[5]", the final[5] may indicate that the corresponding selectable element is fifth below its closest parent node.

As another example, a hierarchical position identifier for the selectable element beneath the aforementioned selectable element may be "html, body, div#mydiv[3], p[4], a[6]".

In one embodiment, analytics data generated by data collection code 208 may include a region identifier that may identify a region of content from which a selectable element was selected. For example, in a website having dynamic content, first analytics data may be generated in response to a selection of a selectable element located within a region of the content. Second analytics data may be generated in response to a selection of a different selectable element located within the same region of content. Each of the first and second analytics data may include the same region identifier. In some embodiments, a region may be defined for a selectable element. As a result, generation of the region identifier may include deriving the region from the actual definition of the selectable element from the content. For example, upon selection of a selectable element, data collection code 208 may search the content for regions and determine if the selected selectable element is contained within a region. If it is, the region identifier may be included as part of the analytics data.

In some embodiments, data collection code 208 may determine if region tracking is enabled. If region tracking is enabled, a hierarchical data structure of the content (e.g., html file) may be searched until finding a closest parent node with a region identifier. The found region identifier may be stored as part of the analytics data.

In one example of an implementation of data collection code 208, data collection code 208 may be called with its result stored to a variable. Data collection code 208 may generate a partial string for the selectable element in question. For example, a selectable element's string may include: "div[@id='unique div']/p[5]/a". In one embodiment, data collection code 208 may walk up the document object model and save each parent node until either it finds a node with an ID attribute or until it reaches the root node "<html>". Thus, the respective hierarchical position identifiers may include an ID attribute of one of the selectable element's director ancestors. In such cases, the hierarchical position identifier for a selectable element may only include information up to the ancestor having an ID attribute. Moreover, data collection code 208 may determine, for a given selectable element, how many others of the same type of element precede it under the same parent node. In the example string "div[@id='unique div']/p[5]/a", the selectable element is a child of the fifth paragraph tag under the div.

In some embodiments, if the selectable element includes an ID attribute, data collection code 208 may generate analytics data without including a hierarchical position identifier. In other embodiments, however, analytics data may include a hierarchical position identifier even if the selectable element includes an ID attribute. For instance, analytics data generated for a selectable element may be located within a region having a region identifier may nevertheless include a hierarchical position identifier.

Data collection code 208 may be cross-browser compatible (e.g., Firefox, Internet Explorer, Chrome, etc.) and standards compliant in that data collection code 208 may produce the same hierarchical position identifier for a particular selectable element regardless of the browser executing the code. As described below, report generator code 210 may likewise be cross-browser compatible, for example, in a browser plug-in embodiment, so that its matching code may accurately match a selectable element to analytics data regardless of the browser used.

Figure 9A:
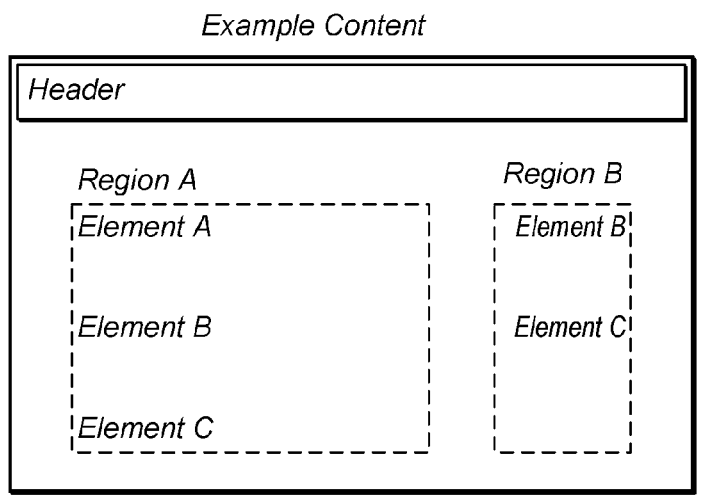
FIGS. 9A-9B illustrate various examples of dynamic regions of content, according to some embodiments.
Figure 9B:
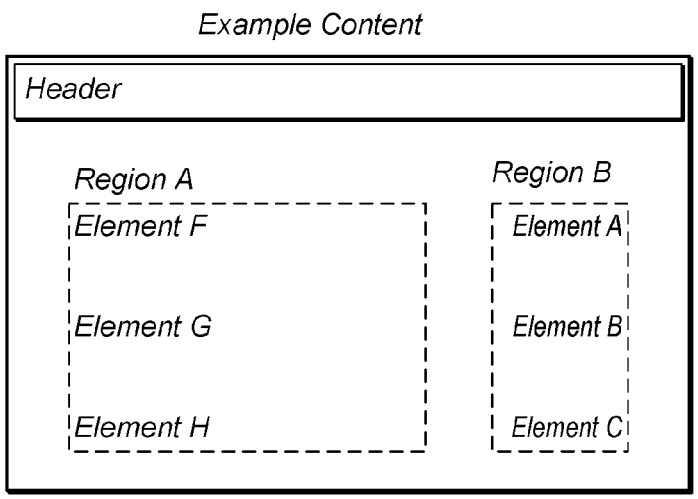

In some embodiments, a website may include a similar layout for various webpages throughout the website. For instance, a news website may have three different sections: sports, entertainment, and domestic news. Each separate section may have a similar or same layout. As shown in FIGS. 9A-B, the content may include a main story portion as well as a side story portion. Data collection code 208 may generate the same region identifier across various webpages of a website. For example, a selection of a main story on the sports webpage of a website may generate analytics data that includes a region identifier corresponding to the main region of the webpage. Selection of the main story on the entertainment webpage of the website may generate analytics data that includes the same region identifier corresponding to the main region of the webpage. This may allow for tracking of the popularity of sections (e.g., main story, side story) across a website in addition to tracking sections for a particular webpage.

Analytics data generated by data collection code 208 may include one or both of region identifiers and hierarchical position identifiers (and may include other identifiers, as described herein). If region tracking is enabled, data collection code 208 may use both types of identifiers whereas if region tracking is not enabled, data collection code 208 may generate hierarchical position identifiers but not region identifiers.

Data collection code 208, or another portion of content code 200, may, upon execution, provide the analytics data (e.g., the first and second analytics data) to a remote analytics site (e.g., analytics provider 106). The data may be provided upon generation or may be aggregated and provided upon some other request (user 120, content provider 102, analytics provider 106, etc.).

It will be appreciated that each of these elements of content code 200 may be implemented within a single document/file/module, or may be provided in separate documents/files/modules.

Figure 2B:
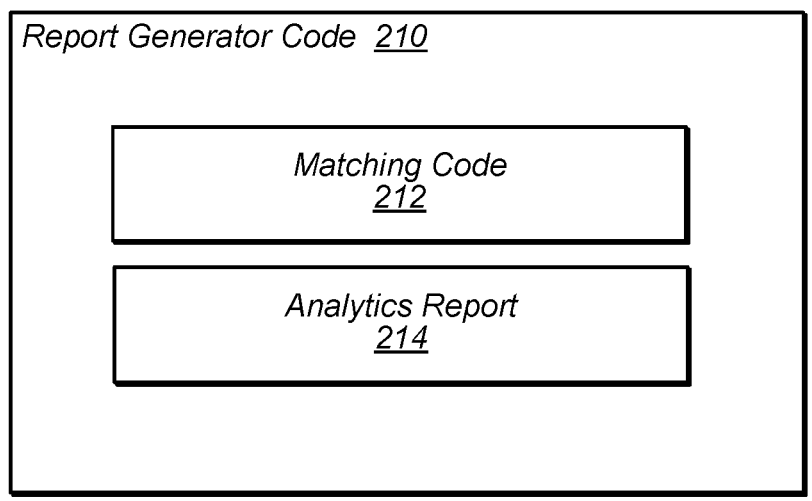
FIG. 2B is a diagram that illustrates analytics report generating code, according to some embodiments.
Figure 8:
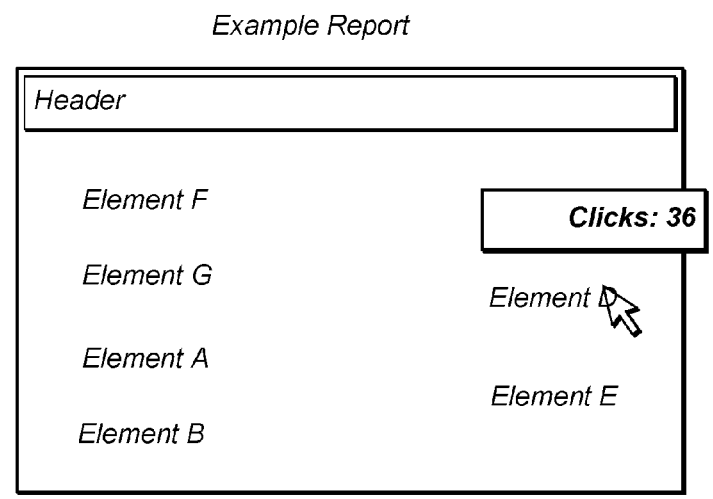
FIG. 8 illustrates an example report for analytics data for dynamic content, according to some embodiments.
Figure 10:
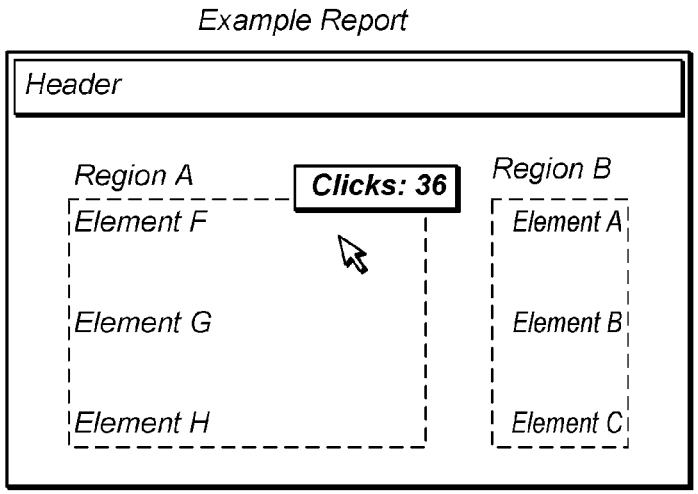
FIG. 10 illustrates an example region report for analytics data for dynamic content, according to some embodiments.

FIG. 2B is a diagram that illustrates report generator code 210, according to some embodiments. Report generator code 210 may include executable code that is provided in response to a request for an analytics report. In some embodiments, report generator code 210 may include HTML code that is executed to render webpage 112a upon which report data may be overlaid, as shown in FIGS. 8 and 10. In other embodiments, report generator code 210 may be a standalone application that presents a visual representation of a current version of the network content from which analytics data is sought. As shown in FIG. 2B, report generator code 210 may include matching code 212 and analytics report 214.

Matching code 212 may allow analytics data to be reconciled such that the existence of duplicate data is minimized. In one embodiment, matching code 212 may match one or more selectable elements to corresponding stored analytics data. Matching code 212 may use a current version of network content from which to determine the selectable elements that are to be matched to the stored analytics data.

In various embodiments, a hash table may be created from an application programming interface (API) request string corresponding to a selectable element from a current version of network content. A hash table for each element the analytics database returns a record for may also exist. For ease of explanation, let the hash table created from the API request string be called req_hash and the other hash table be called data_hash. In addition, two empty arrays: click_data and unmatched_data may also exist. Matching code 212 may loop through the req_hash table and, for each element, loop through the data_hash to attempt to find a match by tag and action (e.g., "A:http://www.examplematch.com"). If a unique match is found between req_hash and data_hash, the element key may be added to the click_data array and its references in req_hash and data_hash may be removed. If no match is found in the data_hash for an element in the req_hash, it may be removed from the req_hash. If multiple matches are found for a given element, it stays in the lists and matching code 212 continues to the next element in the req_hash.

In some embodiments, once matching code 212 has looped through the entire req_hash, added matches to the click_data array, and removed references in the req_hash and data_hash, matching code 212 proceeds to a second matching attempt. In the second matching attempt, matching code 212 may again loop through the entire req_hash, assuming some elements remain in req_hash, attempting to match tag, action, and the hierarchical position identifier (e.g., "A:http://www.adobe.com:alp[2],div#mydiv"). As was the case with the tag and action matching example (first matching attempt) described above, when matches are found, the elements may be removed from both hash tables and added to the click_data array. For any remaining elements in the req_hash after the second matching attempt (e.g., resulting from multiple matches in the first matching attempt but no match in the second matching attempt), matching code 212 may utilize incremental stripping to try to find additional matches.

Incremental stripping may include making the position numbers generic or wildcards (e.g., changing a[3] to a[\d] in a regular expression where a[\] means a[any]) starting with the youngest node and continuing to the oldest node until a single match is found. As a result, the hierarchical position identifier may be made more generic with each iteration until a match is found. As one example, given "a,p[4],div#mydiv[3]" for the req_hash element, matching code 212 may try to match to "a[\d],p[4],div#mydiv[3]". If still no match is found, matching code 212 may try to match the above identifier to "a,p[4],div#mydiv[\d]". If still no match is found, the position number for the next youngest node may be changed. In some embodiments, a default or user-defined search range may be used by modifying an element's positioner within the search range limits. If multiple matches are found at any point, matching code 212 may determine the absolute value of the difference of the position of the req_hash element and those of the matches in the data hash and match to the one with the lowest absolute value. If no matches are found at any point, the req_hash element may be considered to not have any matching data and may be dropped. If multiple matches are found, even after determining the absolute value, the data may be considered duplicate data and may be rendered accordingly (e.g., graphical overlay indicating multiple selections of the element).

Consider the following example of the operation of matching code 212. Matching code 212 may find the following selectable element, for example, in a current version of the network content:
Req_Hash element:
Tag: "A"
Action: "http://www.example.com"
Hierarchical Position Identifier: "div[@id='div1'][3],div,p[2],a[2]"
Matching code 212 may identify the following as potential matches based on the first matching attempt (e.g., matching by tag and action):

Potential Match 1:
Tag: "A"
Action: "http://www.example.com"
Hierarchical Position Identifier: "div[@id='div1'][3],div,p[2],a[4]"
Potential Match 2:
Tag: "A"
Action: "http://www.example.com"
Hierarchical Position Identifier: "div[@id='div1'][3],div,p[3],a[2]"
Potential Match 3:
Tag: "A"
Action: "http://www.example.com"
Hierarchical Position Identifier: "div[@id='div1'][3],div[2],p[2],a[2]"
Potential Match 4:
Tag: "A"
Action: "http://www.example.com"
Hierarchical Position Identifier: "div[@id='div1'][3],div,p[2],a[3]"

In such an example, the second matching attempt may not result in any matches upon which incremental stripping of the hierarchical position identifier may be performed. Incremental stripping may modify the Req_Hash element's hierarchical position identifier ("HPI") to "div[@id='div1'][3],div,p[2],a[\d]". Both potential matches 1 and 4 may be found to match the modified Req_Hash element's HPI. The absolute value of Req_Hash-Potential Match 1 may be taken as 2−4=1−21=2. The absolute value of Req_Hash-Potential Match 4 may similarly be taken as 2−3=I−11=1. As a result, Req_Hash may be matched to Potential Match 4 and Potential Matches 1-3 may be added to the unmatched_data array.

Consider another example of the operation of matching code 212. Matching code 212 may find the following selectable elements, for example, in a current version of the network content:
Req_Hash element 1:
Tag: "A"
Action: "http://www.example.com"
Hierarchical Position Identifier: "div[@id='div1'][3],div,p[2],a[2]"
Req_Hash element 2: Tag: "A"
Action: "http://www.example.com"
Hierarchical Position Identifier: "div[@id='div1'][3],div,p[3],a[3]"
Matching code 212 may identify the following as potential matches based on the first matching attempt (e.g., matching by tag and action):
Potential Match 1:
Tag: "A"
Action: "http://www.example.com"
Hierarchical Position Identifier: "div[@id='div1'][3],div,p[2],a[4]"
Potential Match 2:
Tag: "A"
Action: "http://www.example.com"
Hierarchical Position Identifier: "div[@id='div1'][3],div,p[3],a[2]"
Potential Match 3:
Tag: "A"
Action: "http://www.example.com"
Hierarchical Position Identifier: "div[@id='div1'][3],div[2],p[3],a[2]"

In this example, the second matching attempt may not result in any matches upon which element positioners may be incrementally stripped from the HPI. As an example, the identified Req_Hash elements' and potential matches' HPIs may be modified as follows:

Req_Hash Element 1: "div[@id='div1'][3],div,p[2],a" where "a" is considered to be "a[any]"
Req_Hash element 2: "div[@id='div1'][3],div,p[3],a"
Potential Match 1: "div[@id='div1'][3],div,p [2],a"
Potential Match 2: "div[@id='div1'][3],div,p[3],a"
Potential Match 3: "div[@id='div1'][3],div[2],p[3],a"

Potential Match 1 may be matched to Req_Hash Element 1 and Potential Match 2 may be matched to Req_Hash Element 2. Potential Matches 3 may be added to the unmatched_ data array. The matches may be rendered as an overlay on simulated network content in a standalone analytics report 214 application or as an overlay over current network content, as implemented in a browser plug-in embodiment, as described below regarding analytics report 214.

As described above, any elements remaining in the req_hash at this point may be assumed to not have any matching data and may be dropped. Any remaining elements in the data_hash may be added to the unmatched_data array. Unmatched_data may be presented in the analytics report 214 as elements not found in the current version of network content. For example, such data may correspond to elements that no longer exist in the network content, such as an old, no longer relevant news story from a news website, or a product no longer available for sale on a retailer's website.

In various embodiments, matching code 212 may perform element position variation matching. Element position variation matching extends a search to neighboring element positions. For example, if a string "div,p,a[3]" is being searched for, element position variation matching may attempt to match the string to "div,p,a[4]" and/or "div,p,a [2]".

In some embodiments, matching code 212 may search the analytics database for direct matches of an attribute ID of a current element of the current version of the network content. This may be done before or after performing any incremental stripping or position variation matching. For example, one or more current elements of the current version of the network content may include a region ID attribute. Matching code 212 may search the analytics database, or data_hash, for elements that include the same region ID attribute, e.g., <div onclick="s_regionID='myregion';">.

Matching code 212 may include some of the above described features and not others, in various embodiments. For example, in some embodiments, matching code 212 may not perform element position variation while in other embodiments, it may perform element position variation. Still in other embodiments, ID attributes may also be incrementally stripped from the analytics data, in addition to, or instead of, incrementally stripping element positioners from the HPIs.

Analytics report 214 may include a visual or non-visual display of analytics data resulting from matching code 212. For example, analytics report 214 may be a visual overlay of analytics information on top of a current version of the network content form which analytics data is sought. In one embodiment, one or more of analytics report 214, matching code 212, and report generator code 210 may be in the form of a browser plug-in such that actual content is loaded in a browser with analytics data overlaid on top of the actual content. Analytics data may be overlaid on top of each selectable element or region upon execution of report generator code 210 or in response to user input (e.g., hovering over or clicking on a selectable element). The latter example is illustrated in FIGS. 8 and 10. The arrow in FIGS. 8 and 10 is hovering over a selectable element and region, respectively, upon which an indication of the analytics data 214 is overlaid on top of the content. In the examples shown, the indication is a frequency of the number of selections (e.g., 36 clicks in FIGS. 8 and 10) of the respective selectable element or region. In other embodiments, generator code 210 may be a standalone implementation that may be installed locally, from which network content can be loaded, and overlays may be inserted apart from any browser. In some examples, an indication of more than one selectable element may be displayed at a time. The indication may be a shade or darkness of a color to indicate a frequency of selection (e.g., darker for more frequent, lighter for less frequent) to differentiate between different selectable elements.

Analytics report 214 may be capable of reporting analytics data on a selectable element basis, region basis, or a combination of the two. Combination reporting may be provided at different times or at the same time. For instance, an indication of element selection may be provided in one color while an indication of selection of an element within a region may be provided in another color such that the different data can be distinguished even if showing at the same time. The different reporting capabilities may be user-selectable. Further, region reporting may provide an indication of a region across multiple webpages of a website. For example, region reporting may provide indication of a frequency of selection of any selectable element within the main regions of a sports webpage, entertainment webpage, and domestic news webpage, respectively, of the same website. As a result, popularity of a region or section across an entire website may be tracked.

Using a hierarchical position identifier may offer many advantages. For example, by utilizing a hierarchical position identifier, cross-browser compatibility may be supported that may allow for more accurate matching of selectable elements with analytics data without having to emulate browser specific properties that are native to one browser but not others. Further, such an identifier may be less susceptible to changes in dynamic network content than other identifiers and may help distinguish between duplicate links. Moreover, using a hierarchical position identifier may also decrease cardinality in a database, which may lead to more accurate matching and less memory requirements.

Using a region identifier may offer similar advantages. For example, using a region identifier may allow for tracking of a region of network content or, in some cases, of a region for various pages of content across a network content site. In such cases, individual element tracking may or not be as relevant as tracking a particular region of interest.

Figure 3:
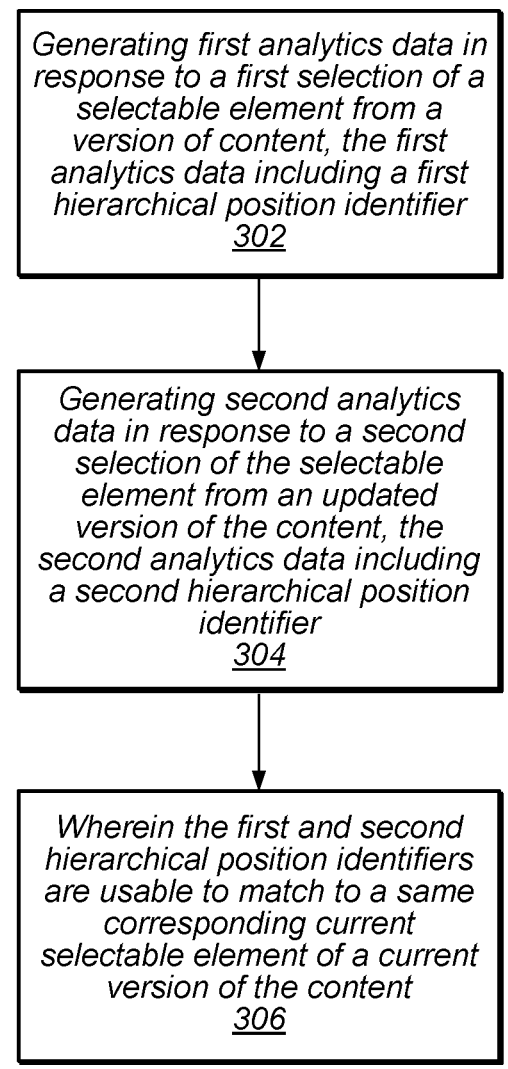
FIG. 3 is a flowchart that illustrates a method for analytics data collection according to some embodiments.

Turning now to FIG. 3, one embodiment of analytics data collection is illustrated. While the blocks are shown in a particular order for ease of understanding, other orders may be used. In some embodiments, the method of FIG. 3 may include additional (or fewer) blocks than shown. Blocks 302-306 may be performed automatically or may receive user input.

As illustrated at 302, first analytics data may be generated. First analytics data may be generated in response to a first selection of a selectable element (e.g., a link, button, anything with an anchor tag or onclick attribute, etc.) from a version of content (e.g., network content, website, FTP site, etc.). The first analytics data may include a first hierarchical position identifier.

Figure 7A:
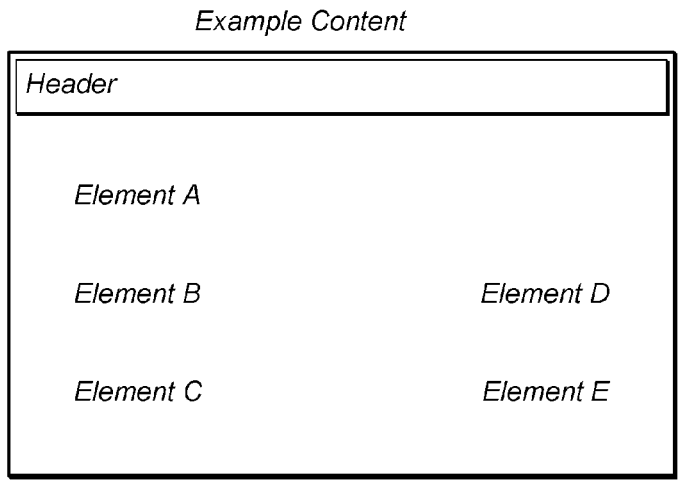
FIGS. 7A-7B illustrate various examples of dynamic content, according to some embodiments.
Figure 7B:
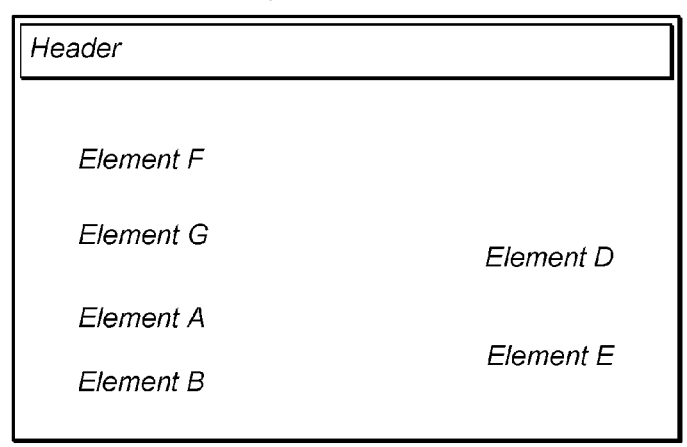

At 304, second analytics data may be generated. Second analytics data may be generated in response to a second selection of the selectable element from an updated version of content. Like the first analytics data, the second analytics data may also include a hierarchical position identifier. The content may be an updated/different version because the content is dynamic. For example, the content could be a news website or media portal that changes frequently. In various examples, the content may be updated in the sense that elements are moved from the time of the first analytics data generation to the second analytics data generation. Updated content may also include situations where elements have been added and/or subtracted from the content. Referring to FIGS. 7A-B for an example, first analytics data may be generated in response to a selection of the selectable element, Element D, from FIG. 7A. Second analytics data may be generated in response to a selection of the selectable element, Element D, from FIG. 7B. Note that the content is updated from FIG. 7A to FIG. 7B in that additional Elements F and G have been added in FIG. 7B and Element C has been removed.

The respective hierarchical position identifiers of the first and second analytics data may be the same, or in some embodiments, may be different, even though each correspond to the same selectable element. Each may include tag names for a plurality of parent nodes located above the selectable element in a hierarchical data structure of the content at the time of generation of the respective analytics data. Each may also include information on the corresponding selectable element's respective order among peer nodes in the hierarchical data structure below a closest common parent node. As an example, a hierarchical position identifier may be "html,body,div#mydiv[3],p[4],a[2]". In such an example, the example selectable element's respective order among peer nodes may be 2, from "a[2]" meaning that one peer node precedes it under the closest common parent node.

As illustrated at 306, each of the first and second hierarchical position identifiers may be usable to match to a same corresponding current selectable element of a current version of the content. In various embodiments, the actual matching may be performed at a remote location from the point of generation of the analytics data. For example, as described herein, generation may be executed by a data collection code embedded in network content while matching may be performed at a later time by a different computing device. In some embodiments, the first and second analytics data may be provided to a remote analytics site, where the analytics data may be stored for later use.

Figure 4:
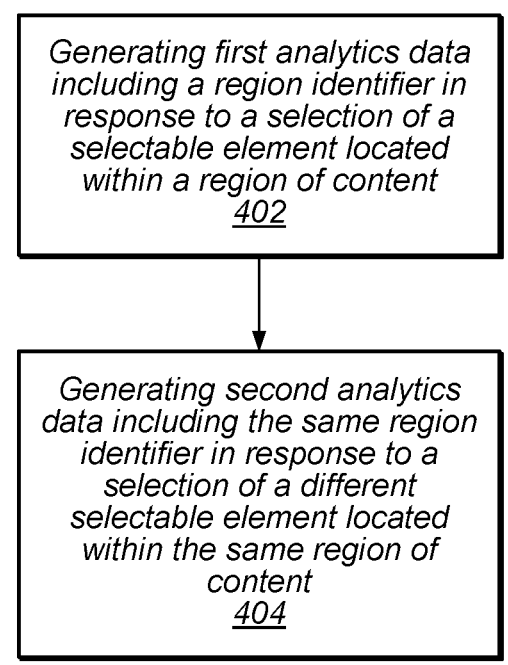
FIG. 4 is a flowchart that illustrates another method for analytics data collection according to some embodiments.

Turning now to FIG. 4, another embodiment of analytics data collection is illustrated. While the blocks are shown in a particular order for ease of understanding, other orders may be used. In some embodiments, the method of FIG. 4 may include additional (or fewer) blocks than shown. Blocks 402-404 may be performed automatically or may receive user input. The method of FIG. 4 may be used in conjunction with the method of FIG. 3. Accordingly, a combination of some or all of the blocks of FIGS. 3 and 4 may be used in some embodiments.

As illustrated at 402, first analytics data may be generated. First analytics data may be generated in response to a selection of a selectable element (e.g., a link, button, anything with an anchor tag or onclick attribute, etc.) located within a region of content (e.g., network content, website, FTP site, etc.). The first analytics data may include a region identifier that corresponds to the region of the content from which the selectable element was selected. For instance, in an example of a news website, the news site may include a top news region and a side news region. Thus, in some embodiments, if a selection of the selectable element was from the top news region or a news website, the first analytics data may include a region identifier corresponding to the top news region.

At 404, second analytics data may be generated. Second analytics data may be generated in response to a selection of a different selectable element from the same region of content. Like the first analytics data, the second analytics data may also include the same region identifier that corresponds to the same region of the content from which the different selectable element was selected. Continuing the example from above and referring to FIGS. 9A-9B for illustration, consider that the first analytics data was generated from a selection of Element A of FIG. 9A, from Region A. The second analytics data may be generated from a selection of Element B or C of FIG. 9A or of Elements F, G, or H, of FIG. 9B as each of those elements are located in Region A of the example content of FIGS. 9A-B.

In various embodiments, generating analytics data may include searching a data structure of the content for a region identifier associated with the selected element. For example, a data structure of the content (e.g., an html file) may include a region identifier associated with a selectable element or a parent node of a selectable element. In some embodiments, generating analytics data may include determining that region tracking is enabled (e.g., a flag or some indicator in the content). Generating analytics data may also include searching the hierarchical data structure of the content until finding a closest parent node of the selected element with a region identifier. The region identifier may then be stored as part of the analytics data. As described herein, analytics data may also include one or more element identifiers, in addition to, or instead of a region identifier. Moreover, the first and second analytics data may be provided to a remote analytics site.

The first and second analytics data may be generated from selections of different pages of network content. For instance, the example content of FIGS. 9A-9B may be separate webpages of a website. FIG. 9A may be the sports webpage of the website while FIG. 9B may be the domestic news webpage of the website. The top story region of each webpage, e.g., Region A from FIGS. 9A-9B, may include the same region identifier such that a selection of a selectable element from either of the webpage's top story region may generate analytics data that includes the same region identifier. As a result, a region of a website across various webpages may be tracked, in addition to regions of individual webpages. In one embodiment, an element on a page of network content may include multiple region identifiers so that the region could be tracked in different ways.

Figure 5:
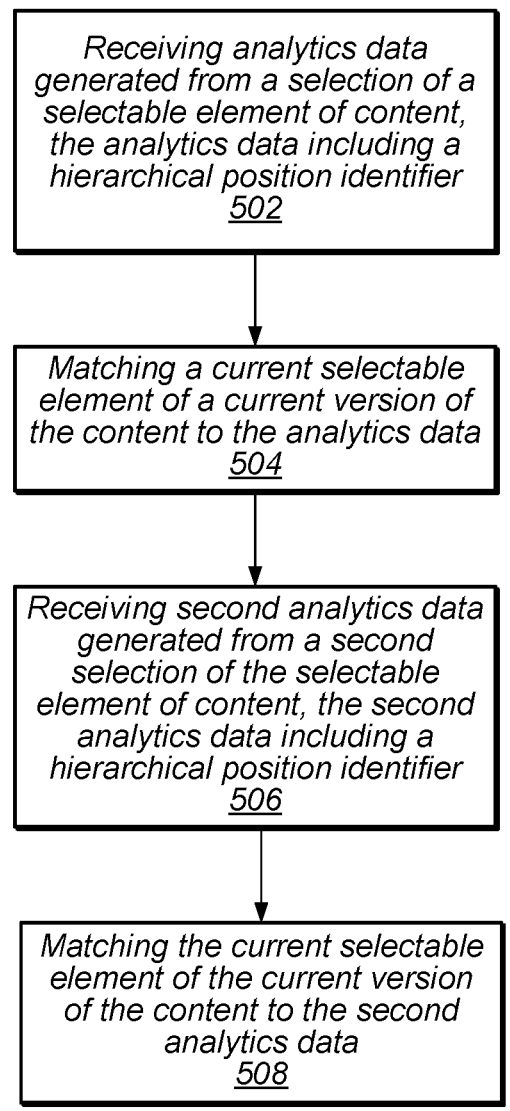
FIG. 5 is a flowchart that illustrates a method for analytics data matching, according to some embodiments.

Turning now to FIG. 5, one embodiment of matching analytics data is illustrated. While the blocks are shown in a particular order for ease of understanding, other orders may be used. In some embodiments, the method of FIG. 5 may include additional (or fewer) blocks than shown. Blocks 502-508 may be performed automatically or may receive user input. The method of FIG. 5 may be used in conjunction with the methods of FIGS. 3-4 and 6. Accordingly, a combination of some or all of the blocks of FIGS. 3-6 may be used in some embodiments.

As illustrated at 502, analytics data may be received. The analytics data may have been generated from a selection of a selectable element (e.g., link, button, something with an onclick attribute or anchor tag, etc.) of content (e.g., network content, website, file from FTP site). The received analytics data may include a hierarchical position identifier (e.g., "html,body,div#mydiv[3],p[4],a[2]") that corresponds to a location of the selectable element in a hierarchical data structure (e.g., html file) of the network content.

As shown at 504, a current selectable element of a current version of the content may be matched to the analytics data. The matching may be performed in a browser plug-in with the current version of the content loaded in the browser or as a stand alone application. For example, the current version of the content may be a simulated version of the current content.

Matching may include comparing data corresponding to a plurality of selectable elements of the current version of the network content with the analytics data. The plurality of selectable elements may include the current selectable element. The data corresponding to the plurality of selectable elements of the current version may include current data corresponding to the current selectable element. Matching may also include determining that at least a portion of a hierarchical position identifier of the current data matches at least a portion of the hierarchical position identifier of the analytics data.

In various embodiments, matching may include determining that the analytics data and current data corresponding to the current selectable element of the current version of the network content each include a common other identifier (e.g., tag and action identifier). Matching may further include determining that the hierarchical position identifier of the analytics data is different than the hierarchical position identifier of the current data. In some embodiments, matching may include incrementally removing a portion of each of the respective hierarchical position identifiers of the analytics data and the current data until the remaining portion of each of the respective hierarchical position identifiers of the analytics data and current data match. In some embodiments, a portion of the respective hierarchical position identifiers may be incrementally removed until reaching a parent node of either of the selectable element or current selectable element.

At 506, second analytics data may be received. As was the case with the received analytics data, the received second analytics data may have been generated from a selection of a selectable element of content. The received analytics data may also include a hierarchical position identifier. In some cases, the hierarchical position identifier of the second analytics data is the same as the hierarchical position identifier of the analytics data while in other cases, the hierarchical position identifiers are different. In either case, the analytics data and second analytics data may be matched. Note that in some embodiments, blocks 506 and 508 may not be performed.

As illustrated at 508, the current selectable element of the current version of the content may also be matched to the second analytics data. The matching can occur even when the content has changed regardless if the respective hierarchical position identifiers of the analytics data and second analytics data are different. For example, if they are different, element position variation, as described herein, may be employed to match the second analytics data.

In various embodiments, the method of FIG. 5 may also include overlaying an indication of the matching on a display of the current version of the network content. Such an indication may represent a frequency of selection of the selectable element. For example, as illustrated in FIG. 8, Element D has been selected 36 times. As shown, an example report may provide an indication of 36 clicks as an overlay over the current version of the network content. In the example shown, the overlay is displayed in response to an input (e.g., a cursor hovering over, touch input, etc.) over the selectable element.

Figure 6:
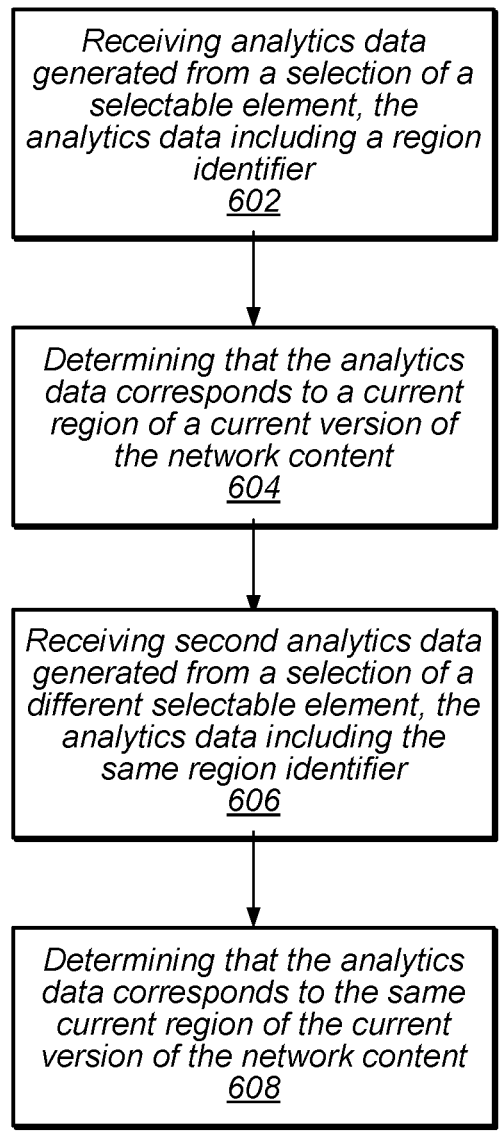
FIG. 6 is a flowchart that illustrates another method for analytics data matching, according to some embodiments.

Turning now to FIG. 6, another embodiment of matching analytics data is illustrated. While the blocks are shown in a particular order for ease of understanding, other orders may be used. In some embodiments, the method of FIG. 6 may include additional (or fewer) blocks than shown. Blocks 602-608 may be performed automatically or may receive user input. The method of FIG. 6 may be used in conjunction with the methods of FIG. 3-5. Accordingly, a combination of some or all of the blocks of FIGS. 3-5 may be used in some embodiments.

As illustrated at 602, analytics data may be received. The analytics data may have been generated from a selection of a selectable element (e.g., link, button, something with an onclick attribute or anchor tag, etc.) from a region of content (e.g., network content, website, file from FTP site). The received analytics data may include a region identifier. The region identifier may correspond to the region of the network content from which the selectable element was generated and may be derived from the actual content. In some embodiments, the received analytics data may also include a hierarchical position identifier as described herein.

As shown at 604, it may be determined that the analytics data corresponds to a current region of a current version of the content. For example, the analytics data may be searched for a region identifier that matches a region identifier of the current version of the content.

At 606, second analytics data may be received. The received second analytics data may have been generated from a selection of a different selectable element from the same region of the content. In some embodiments, the network content may include multiple pages. For example, a website may include multiple webpages. The region in the network content may correspond to a first region on a first page of the network content. It may also correspond to a second region on a second page of the network content. In some embodiments, the first analytics data may be generated in response to a selection of a selectable element from the first region on the first page and the second analytics data may be generated in response to a selection of a different selectable element from the second region on the second page. In other instances, the first and second analytics data may be generated from selections from the same region of the same page of the network content. The received second analytics data may, m some embodiments, also include a hierarchical position identifier. Note that m some embodiments, blocks 606 and 608 may not be performed.

As illustrated at 608, and similar to 604, it may be determined that the second analytics data corresponds to the same current region of the current version of the content.

In various embodiments, the method of FIG. 6 may also include overlaying an indication of an aggregate value of selections of selectable elements of a region of the network content on a display of the current version of the content. The indication may represent a frequency of selection of various selectable elements located within the region of the network content.

It will be appreciated that the methods of FIGS. 3-6 are example embodiments of methods employed according to the techniques described herein. The methods of FIGS. 3-6 may be modified to facilitate variations of its implementations and uses. For example, although some embodiments have been described with respect to webpages, the techniques may be applied for use with similar network content.

The methods of FIGS. 3-6 may be implemented in software, hardware, or a combination thereof.

Example Implementations

FIGS. 7A-10 illustrate example content and reports that may aid in understanding the described embodiments.

FIG. 7A may be an example website with clickable links, Elements A-E. As an example, a user of the website may click on Element D, which may cause data collection code to execute resulting in generated analytics data. Content may be dynamic such that for a subsequent click of Element D, in FIG. 7B, two additional elements, Elements F and G, may have been added, and one element, Element C may have been removed from the website. The structure of the hierarchical position identifier in the analytics data may allow for more reliable tracking on a clickable element in dynamic content. An example report is shown in FIG. 8 that may include an overlay indicating that Element D has been clicked 36 times, including clicks of Element D before and after content has changed.

FIG. 9A may be an example website with two different regions, A and B. For instance, FIG. 9A may represent a news website with a main story region, A, and a side story region, B. A user of the website may click on Element A, which may cause data collection code to execute resulting in generated analytics data including a region identifier corresponding to region A. Content may be dynamic such that all of the main news stories have been replaced in FIG. 9B. Another user may click on a main news story, for example, Element F, at a time when the website is as shown in FIG. 9B. In various embodiments, the generated second analytics data may also include the same region identifier corresponding to region A. FIG. 10 illustrates an example report showing that 36 clicks have been made of selectable elements in Region A, which may correspond to different selectable elements.

Program instructions and/or data for implementing embodiments of data collection code and/or matching code as described herein may, for example, be stored on a computer-readable storage medium. A computer-readable storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Exemplary Computer System

Figure 11:
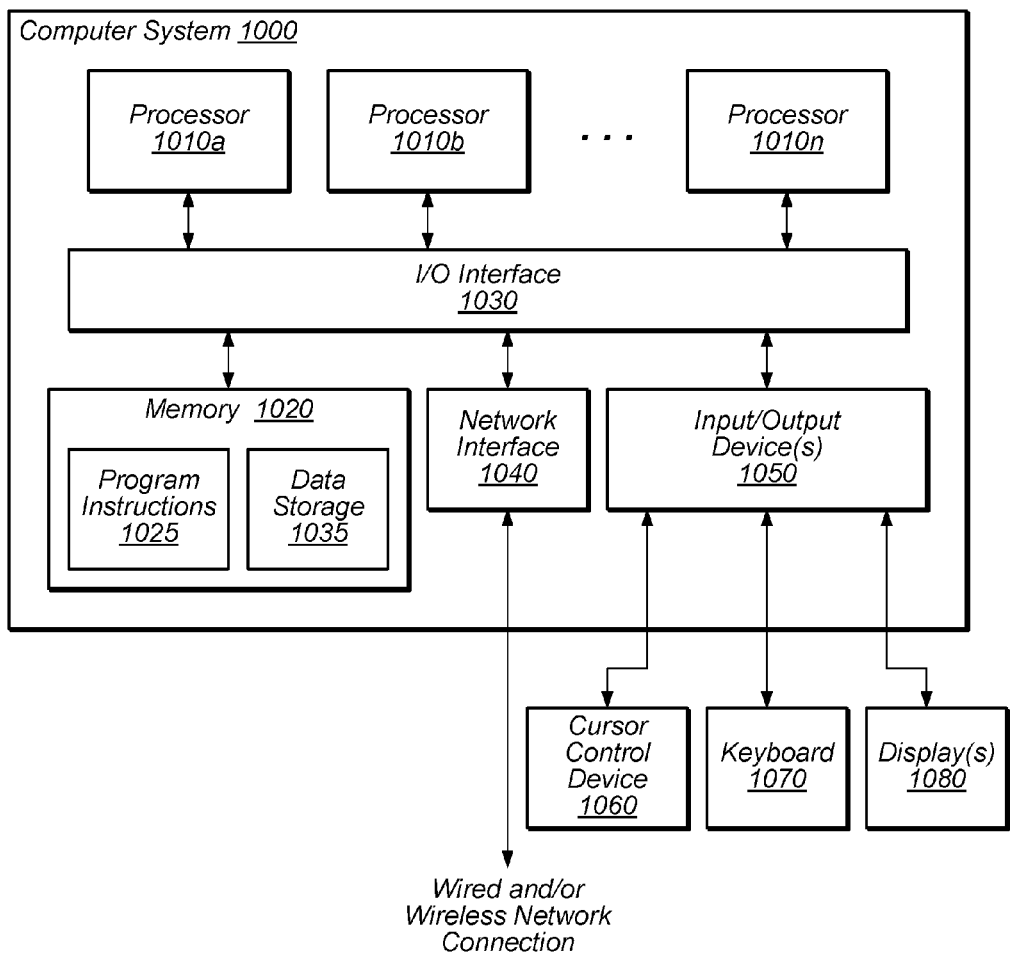
FIG. 11 illustrates an example computer system that may be used m accordance with one or more embodiments.

Various portions of data collection code and/or matching code may be executed on one or more computer systems, which may interact with various other devices. One such computer system is illustrated by FIG. 11. For example, content provider 102, client 104, analytics provider 106, content server 110, browser application 112, analytics server 114, analytics database 116, analytics report module 118, report generator code 164, and data collection code 162 may each include, employ or be executed on one or more computer systems.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of data collection code and/or matching code as described herein, and data storage 1035, comprising various data accessible by program instructions 1025. In one embodiment, program instructions 1025 may include software elements of a layout-preserved text generation method illustrated in the above Figures. Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of analytics data collection or analytics data matching methods as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations. In some embodiments, portions of the techniques described herein may be hosted in a cloud computing infrastructure.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A computer implemented method for generating a web analytics report based on user interactions with a region of a website across multiple webpages of the website, the method comprising:
   receiving, at a computing device, web analytics data indicating user interactions with one or more selectable elements located within the region of the website, the region of the website corresponding to a portion of each of the multiple webpages of the website that is associated with a same region identifier, the web analytics data including the region identifier corresponding to the region of the website;

determining, by the computing device, that the web analytics data corresponds to a current version of the website;

calculating, by the computing device, based on the web analytics data, an aggregate value of user interactions with the one or more selectable elements located within the region of the website; and modifying the current version of the website by rendering an indication of the aggregate value of the user interactions with the one or more selectable elements located within the region of the website on a display of the current version of the website, wherein the aggregate value of the user interactions represents a frequency of the user interactions with the one or more selectable elements.

2. The method of claim 1, wherein:

the determining comprises determining, based at least in part on the region identifier, that the web analytics data corresponds to a current region of the current version of the website; and the indication of the aggregate value of the user interactions comprises indicating a frequency of user interactions with the one or more selectable elements located within the current region of the website.

3. The method of claim 1, wherein the indication of the aggregate value of the user interactions comprises overlaying the aggregate value of the user interactions with the one or more selectable elements located within the region of the website on the display of the current version of the website.

4. The method of claim 1, wherein the web analytics data:

was generated from tracking the user interactions with the one or more selectable elements located within a current region of the website; and includes the region identifier corresponding to the current region of the website.

5. The method of claim 1, wherein:

the region in the website includes a first region on a first page of the website and a corresponding second region on a second page of the website;

first web analytics data was generated from user interaction with a first selectable element from the first region on the first page; and second web analytics data was generated from user interaction with a second selectable element from the second region on the second page.

6. The method of claim 5, wherein each of the generated first and second web analytics data includes respective element identifiers corresponding to the first and second selectable elements.

7. The method of claim 1, wherein the web analytics data was generated by:

determining that region tracking is enabled;

searching a hierarchical data structure of the website to identify a respective closest parent node of each of the one or more selectable elements with the region identifier; and storing the region identifier as part of the web analytics data, the region identifier corresponding to a current region of the website.

8. A non-transitory computer-readable storage medium having instructions stored thereon which, when executed by a computing device, cause the computing device to perform operations for generating a web analytics report based on user interactions with a region of a website across multiple webpages of the website, the operations comprising:

receiving web analytics data indicating user interactions with one or more selectable elements located within the region of the website, the region of the website corresponding to a portion of each of the multiple webpages of the website that is associated with a same region identifier, the web analytics data including the region identifier corresponding to the region of the website;

determining that the web analytics data corresponds to a current version of the website;

calculating, based on the web analytics data, an aggregate value of user interactions with the one or more selectable elements located within the region of the website; and modifying the current version of the website by rendering an indication of the aggregate value of the user interactions with the one or more selectable elements located within the region of the website on a display of the current version of the website, wherein the aggregate value of the user interactions represents a frequency of the user interactions with the one or more selectable elements.

9. The non-transitory computer-readable storage medium of claim 8, wherein the web analytics data was generated by:

determining that region tracking is enabled;

searching a hierarchical data structure of the website to identify a respective closest parent node of each of the one or more selectable elements with the region identifier; and storing the region identifier as part of the web analytics data, the region identifier corresponding to a current region of the website.

10. The non-transitory computer-readable storage medium of claim 8, wherein:

the region in the website includes a first region on a first page of the website and a corresponding second region on a second page of the website;

first web analytics data was generated from user interaction with a first selectable element from the first region of the first page; and second web analytics data was generated from user interaction with a second selectable element from the second region of the second page.

11. The non-transitory computer-readable storage medium of claim 10, wherein each of the generated first and second web analytics data includes respective element identifiers corresponding to the first and second selectable elements.

12. The non-transitory computer-readable storage medium of claim 8, wherein:

the determining comprises determining, based at least in part on the region identifier, that the web analytics data corresponds to a current region of the current version of the website; and the indication of the aggregate value of the user interactions comprises indicating a frequency of user interactions with the one or more selectable elements located within the current region of the website.

13. The non-transitory computer-readable storage medium of claim 8, wherein the indication of the aggregate value of the user interactions comprises overlaying the aggregate value of the user interactions with the one or more selectable elements located within the region of the website on the display of the current version of the website.

14. The non-transitory computer-readable storage medium of claim 8, wherein the web analytics data:

was generated from tracking the user interactions with the one or more selectable elements located within a current region of the website; and includes the region identifier corresponding to the current region of the website.

15. A system for generating a web analytics report based on user interactions with a region of a website across multiple webpages of the website, the system comprising:
   a processor;
   a display device; and
   a memory having executable instructions stored thereon, that, when executed by the processor, cause the processor to perform operations for tracking user interactions with selectable elements of the website, the operations comprising:
   receiving web analytics data indicating the user interactions with one or more selectable elements located within the region of the website, the region of the website corresponding to a portion of each of the multiple webpages of the website that is associated with a same region identifier, the web analytics data including the region identifier corresponding to the region of the website;
   determining that the web analytics data corresponds to a current version of the web site;
   calculating, based on the web analytics data, an aggregate value of the user interactions with the one or more selectable elements located within the region of the website; and
   modifying the current version of the website by rendering, on the display device, an indication of the aggregate value of the user interactions with the one or more selectable elements located within the region of the website on a display of the current version of the website, wherein the aggregate value of the user interactions represents a frequency of the user interactions with the one or more selectable elements.

16. The system of claim 15, wherein the rendering comprises overlaying the aggregate value of the user interactions with the one or more selectable elements located within the region of the website on the display of the current version of the website.

17. The system of claim 15, wherein:
   the determining comprises determining, based at least in part on the region identifier, that the web analytics data corresponds to a current region of the current version of the website; and
   the rendering comprises indicating a frequency of user interactions with the one or more selectable elements located within the current region of the website.

18. The system of claim 15, wherein the web analytics data was generated by:
   determining that region tracking is enabled;
   searching a hierarchical data structure of the website to identify a respective closest parent node of each of the one or more selectable elements with the region identifier; and
   storing the region identifier as part of the web analytics data, the region identifier corresponding to a current region of the website.

19. The system of claim 15, wherein:
   the region in the website includes a first region on a first page of the website and a corresponding second region on a second page of the website;
   first web analytics data was generated from user interaction with a first selectable element from the first region on the first page; and
   second web analytics data was generated from user interaction with a second selectable element from the second region on the second page.

20. The system of claim 19, wherein each of the generated first and second web analytics data includes respective element identifiers corresponding to the first and second selectable elements.

* * * * *